United States Patent [19]
Singer

[11] 3,984,632
[45] Oct. 5, 1976

[54] CIRCUIT ARRANGEMENT FOR THE TIME DIVISION MULTIPLEX TRANSMISSION OF ASYNCHRONOUSLY OCCURRING BINARY VALUES OF DATA

[75] Inventor: Johannes Singer, Munich, Germany

[73] Assignee: Siemens Aktiengesellschaft, Munich, Germany

[22] Filed: June 6, 1975

[21] Appl. No.: 584,287

[30] Foreign Application Priority Data
June 6, 1974 Germany............................ 2427346

[52] U.S. Cl. .............................. 178/50; 179/15 A
[51] Int. Cl.² ...................... H04J 3/04; H04L 5/22
[58] Field of Search ............... 178/50, 53.1 R, 63 E, 178/71 B; 179/15 A, 15 BA

[56] References Cited
UNITED STATES PATENTS

| | | | |
|---|---|---|---|
| 3,523,278 | 8/1970 | Hinkel | 178/50 |
| 3,535,450 | 10/1970 | Vollmeyer | 178/50 |
| 3,627,945 | 12/1971 | Diggelmann | 178/50 |
| 3,818,143 | 6/1974 | Vrba | 179/15 A |

*Primary Examiner*—David L. Stewart
*Attorney, Agent, or Firm*—Gerald L. Lett

[57] ABSTRACT

A circuit arrangement for facilitating the transmission of asynchronously occurring binary data values is described. Each binary value change is assigned a multi-bit pulse group in the frame of a coarse scanning pulse train. A pulse discriminator, upon the occurrence of a binary value change and upon the arrival of a scanning signal, emits a write-in command which causes the pulse group to be placed in a register. A counter is provided for counting the number of coarse scanning pulses occurring from the time of occurrence of the write-in command. Prior to reaching a predetermined count, the counter blocks further write-in commands, and after reaching the predetermined count, the write-in commands are released. Thus, a correctly formed pulse group is emitted even though the received binary values might be distorted.

4 Claims, 4 Drawing Figures

CIRCUIT ARRANGEMENT FOR THE TIME DIVISION MULTIPLEX TRANSMISSION OF ASYNCHRONOUSLY OCCURRING BINARY VALUES OF DATA

BACKGROUND OF THE INVENTION

The invention relates to a circuit arrangement for the time division multiplex (t.d.m.) transmission of asynchronously occurring binary values of data, in which in the frame of a relatively coarse sampling pulse train, i.e., a sampling pulse train having a repetition frequency less than the system sampling interval, each change in binary value is assigned a pulse group comprising a plurality of bits. In this arrangement the data are conducted to a binary value change discriminator which following the occurrence of a change in binary value, and upon the arrival of a scanning or sampling signal, emits a write-in command which causes the pulse group to be coupled into a register.

If the charges in binary value of the binary values which are to be transmitted occur asynchronously, and thus at an arbitrary time, a technique know as "multiple scanning and coding with sliding index" can be used to bring such binary values into phase with a transmitting-end t.d.m. transmission system. This technique contemplates that a given binary value be sampled a number of times and that a pulse group containing a number of bits determined by the duration of the binary value be formed. Then, at the transmitting end in the frame of a coarse sampling pulse train each binary value change causes the production of a pulse group comprising a plurality of bits, and this pulse group is transmitted within a t.d.m. signal. This type of pulse group can, for example, consist of three bits which at the transmitting end are fed in serial fashion into the t.d.m. system. This serial feeding-in of the pulse group is carried out during the emission of a plurality of coarse scanning pulse trains and during the duration of the individual binary values. Generally speaking, the feeding-in of the pulse group will have terminated before the occurence of the next change in binary value. This is in particular the case when undistorted data binary values exist. If, however, individual distorted binary values occur, it can come about that the next change in binary value will occur before the pulse group has been fed in, and thus, an incorrect pulse group is emitted.

An object of the invention is, therefore, to provide a circuit arrangement for ensuring the emission of a pulse group even when distorted binary values may occur.

SUMMARY OF THE INVENTION

In accordance with the invention the foregoing and other objects are achieved in that a counter device is provided for counting the number of coarse scanning pulses which occur after the occurrence of a write-in command. The counter serves to release the emission of a further write-in command, respectively, before and following the reaching of a given count.

The circuit arrangement in accordance with the invention facilitates the transmission of data even when individual binary values of this data are distorted, and the data are transmitted across a channel at the limit speed. Thus, the circuit in accordance with the invention enables the distortion range to be extended.

In a preferred exemplary embodiment of the circuit arrangement of the invention the counter device is in the form of a shift register into which is serially coupled a binary signal which has a given logic value, which is supplied with the coarse scanning pulse trains as shift pulses and which is supplied with the write-in command as resetting pulse. Via one of its storage cells, this shift register emits a signal which enables the next write-in command to be emitted. This preferred exemplary embodiment is characterized by a particularly low cost. Also, the shift registers used are obtainable at reasonable prices in the form of integrated modules.

BRIEF DESCRIPTION OF THE DRAWINGS

In the following preferred embodiments constructed according to the invention will be described making reference to FIGS. 1 to 4, in which identical components appearing in more than one figure have been marked with the same references.

DETAILED DESCRIPTION OF THE DRAWINGS

Figure 1:
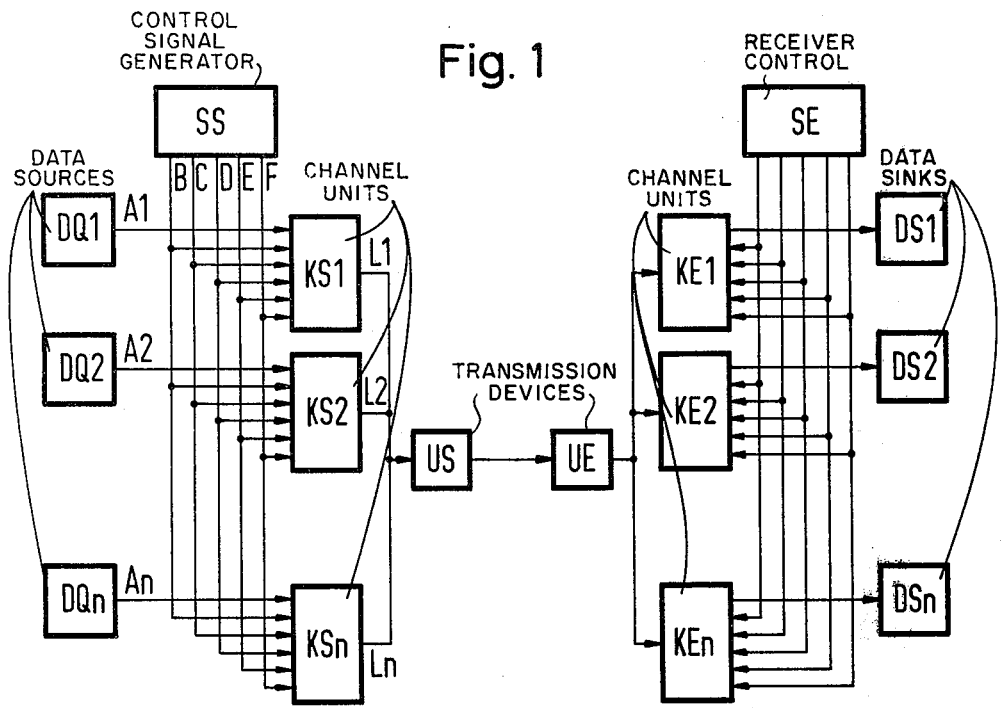
FIG. 1 is a block circuit diagram of a t.d.m. data transmission system of a type in which the invention can be used.

FIG. 1 schematically illustrates data sources DQ1, DQ2 ... DQ$n$, a transmitting-end control signal generator SS, transmitting-end channel units KS1, KS2 ... KS$n$, transmitting-end transmission device US, receiving-end transmission device UE, receiving-end channel units KE1, KE2 ... KE$n$, receiving-end control SE and the data sinks DS1, DS2 ... DS$n$.

The data source DQ1 to DQ$n$ can, for example, be teleprinters or data viewing input devices. It will be assumed that the binary values emitted from the data sources DQ occur asynchronously, and thus at arbitrary times, and are conducted to the channel units KS1 to KS$n$ which bring the binary values into phase with a t.d.m. signal which is transmitted between the transmission devices US and UE. The bringing into phase of the data necessitates several signals which are referenced B, C, D, E, F and which are produced with the control signal generator SS.

At the receiving end, the t.d.m. signal is conducted from the transmission device UE to the channel units KE1 to KE$n$ which isolate the individual data signals and conduct them to the data sinks DS1 to DS$n$. The data sinks can, for example, again be teleprinters or data viewing devices.

Figure 3:
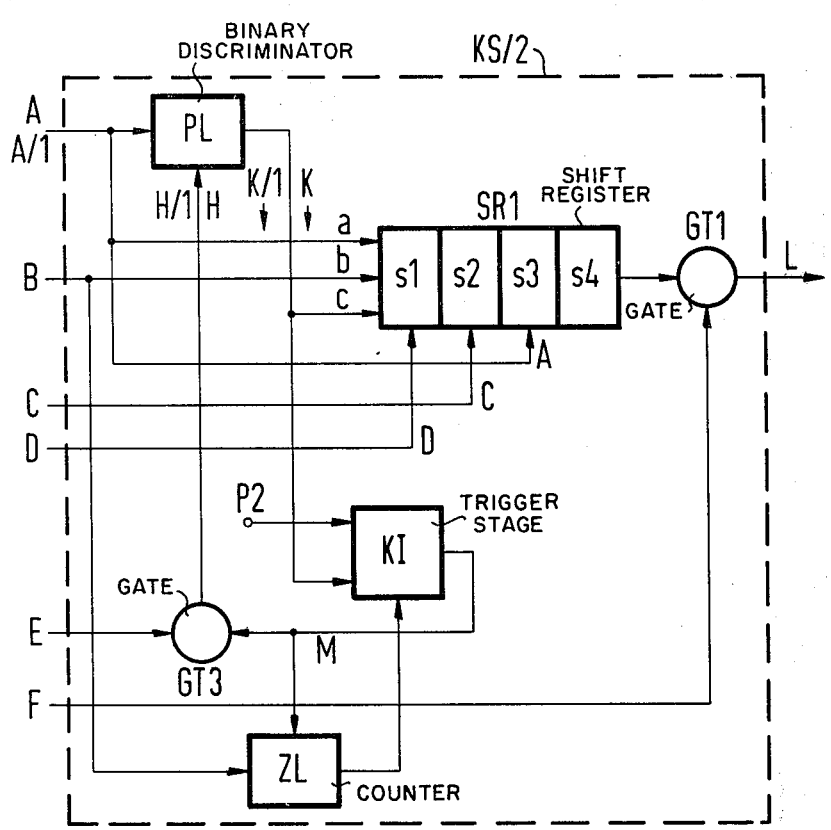
FIG. 3 is a block-schematic diagram of a second exemplary embodiment of a transmitting-end channel unit which serves to monitor a pulse group using a counter and a trigger stage.
Figure 4:
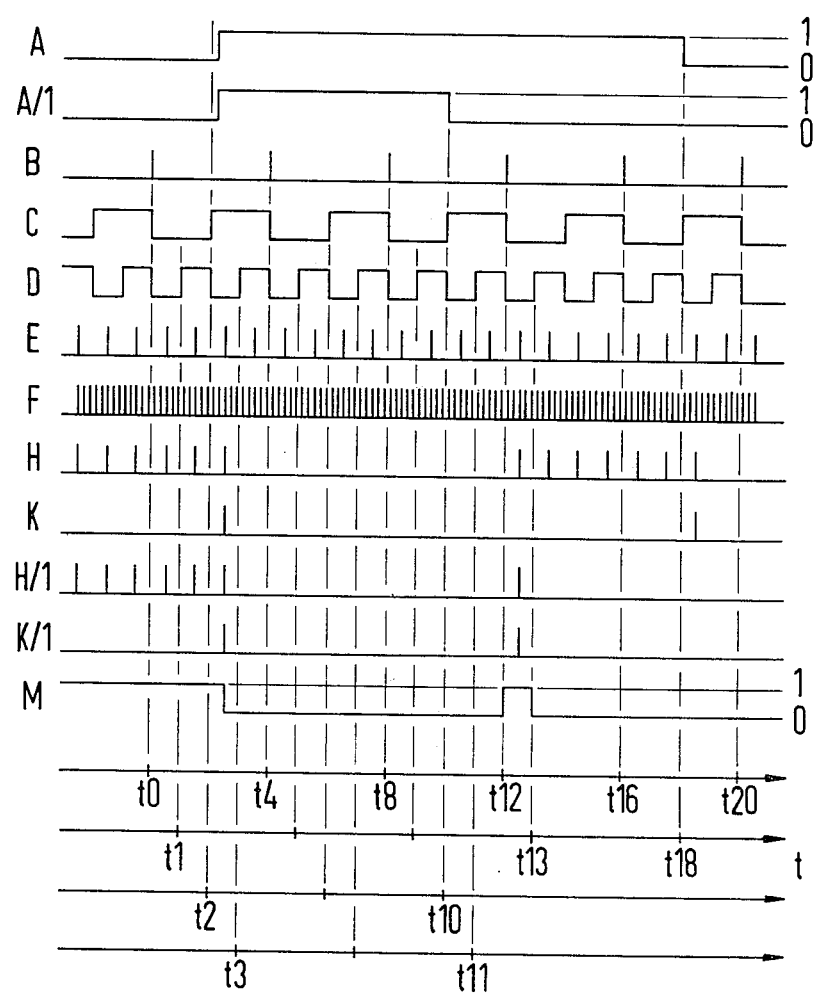
FIG. 4 is a waveform diagram illustrating signals which occur during the operation of the channel units represented in FIGS. 2 and 3.

FIG. 4 shows a few of the signals which are emitted by the control signal generator SS. The abscissa directions relate to the time $t$. The binary values of the binary signals will here be referred to as 0 and 1. The individual signals in FIG. 4 will be discussed in more detail in the description of FIGS. 2 and 3.

Figure 2:
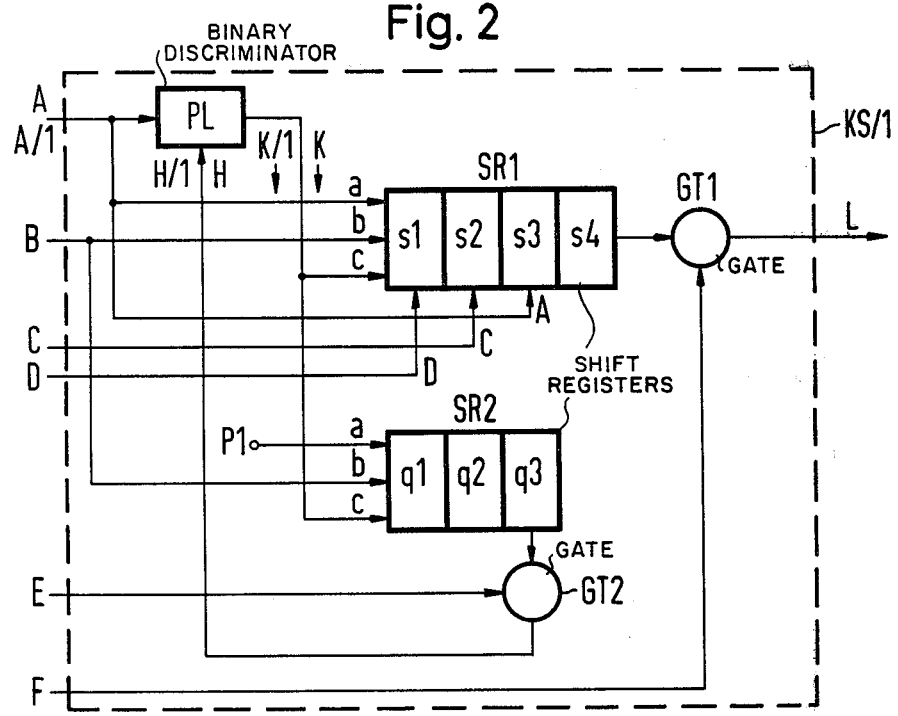
FIG. 2 is a block-schematic diagram showing a first exemplary embodiment of a transmitting-end channel unit in which a shift register is used to monitor the emission of the pulse groups.

FIG. 2 shows the channel unit KS/1 as an exemplary embodiment of one of the channel units KS1 to KS$n$ at the transmitting end in FIG. 1. This channel unit KS/1 comprises a binary value change discriminator PL, shift registers SR1, SR2 and gates GT1, GT2. The binary value change discriminator PL stores an item of information characterizing the binary value changes of the signal A. The signal A is shown in the upper part of FIG. 4. At the instant of the signal H the stored information is interrogated, and if a change in binary value from A=0 to A=1 or from A=1 to A=0 has taken place, the signal K=1 is emitted via the output of the binary value change discriminator PL. The signal A corresponds to one of the signals A1 to A$n$ which are emitted in accordance with FIG. 1 from the data sources DQ1 to DQ$n$.

The shift registers SR1 and SR2 each have three inputs $a, b, c$. The serial input of data takes place via the inputs $a$. Shift pulses are supplied via the inputs $b$. Via the input $c$ of the shift register SR1, a temporary switch-over of the shift register SR1 from serial operation to parallel operation is carried out. A resetting is effected via the input $c$ of the shift register so that the binary value 0 is stored in all the cells $q1, q2, q3$. In the following the mode of operation of the channel unit shown in FIG. 2 will be explained making reference to the signals represented in FIG. 4.

The signal A represents the binary values of the items of data to be transmitted. It will be assumed that the binary value changes can occur asynchronously, and thus, at arbitrary times. In particular in accordance with FIG. 4 it has been assumed that shortly after the time $t2$ a change in binary value from A=0 to A=1 occurs. The signals B, C, D, E, F are produced with the control signal generator SS shown in FIG. 1 and are phase-locked to one another. The changes in binary value of the signal A, thus, are displaced in relation to the signals B, C, D, E, and F which are to be considered as fixed. The signal B is a coarse scanning pulse train, the individual pulses of the signal B occurring with such frequency that during the duration of the signal A=1 a plurality of pulses of the signal B occur. It will be assumed that before the time $t0$ all the cells $s1, s2, s3, s4$ of the shift register SR1 store the binary value 0, that at the time $t0$, the binary value A=0 is coupled via the input $a$ of the shift register SR1 into the cell $s1$ and that the last cell $s4$ emits the binary value 0 to the gate GT1. The latter is then passed on as signal L=0 at the times determined by the signal F. Here also, prior to the time $t0$, pulses of the signal B are continuously conducted as shift pulses via the input $b$.

The pulses of the signal B determine the coarse scanning intervals $t0 - t4, t4 - t8, t8 - t12, t12 - t16, t16 - t20$. With the signals C and D each of these coarse scanning intervals is assigned four fine scanning intervals and are characterized by the binary values of the signals C and D. For example, the coarse scanning interval $t0 - t4$ is assigned the fine scanning intervals $t0 - t1, t1 - t2, t2 - t3, t3 - t4$. Similarly, the other coarse scanning intervals are each assigned four fine scanning intervals. The pulses of the signal E lie within the fine scanning intervals. The pulses of the signals E are released occasionally by the gate GT2 and conducted as signal H to the binary value change discriminator PL. The pulses of the signal H, thus, likewise, lie within the fine scanning intervals.

The binary value change discriminator PL carries out a constant check as to whether a change in binary value is occurring and with the signal K signals the occurrence of the signal A=1 during the duration of the fine scanning interval $t2 - t3$. During the duration of the signal K, the shift register SR1 is changed over to parallel input so that the signals D=0, C=1 and A=1 are input into the cells $s1, s2$ and $s3$.

TABLE

|  | s1 | s2 | s3 | s4 |
|---|---|---|---|---|
| t3 | 0 | 1 | 1 | 0 |
| t4 | 1 | 0 | 1 | 1 |
| t8 | 1 | 1 | 0 | 1 |
| t12 | 1 | 1 | 1 | 0 |

As also can be seen from the Table, at the time $t3$, the shift register SR1 stores the word 0110, and in particular, the word 011 stored in the first three storage cells $s1, s2, s3$ represents a pulse group which signals the occurrence of a change in binary value and signals the fine scanning interval at which the change in binary value occurred. The signals D=0 and C=1 in fact accurately give the fine scanning interval $t2 - t3$. Had the change in binary value occurred one fine scanning interval later, the signals C=1 and D=1 would have signalled the fine scanning interval $t3 - t4$. After the occurrence of the pulse K, the shift register SR1 is re-operated in serial fashion, and the binary values A=1 are constantly input via the input $a$. With the shift pulses of the signal B, after the times $t4, t8$ and $t12$ the words 1011, 1101 and 1110, respectively, are stored in the shift register SR1, and at the times $t4, t8, t12$, the binary values 110 of the pulse group are consecutively output via the cell $s4$ to the gate GT1. In this way the pulse group is emitted as a part of the signal L at the times determined by the signal F. The pulse repetition frequency of the signal F is generally considerably greater than represented since in each coarse scanning interval a total of $n$ pulses of the signal F occur when there are a total of $n$ data sources DQ1 to DQ$n$.

In the case of the signal A it is assumed that after the first positive change in binary value which occurs at approximately the time $t2$, a second change in binary value occurs at the time $t18$. In this case the pulse group diagram is emitted in regular fashion. The second change in binary value could even occur substantially earlier, i.e., until the time $t13$ without disturbing the emission of the pulse group whose last bit is stored at the time $t12$ in the cell $s4$. If the second change in binary value, as illustrated in the case of the signal A/1, occurs as early as the time $t10$, the pulse group is distorted, because shortly after the time $t10$ a signal K is produced, and thus the content of the shift register SR1 would be prematurely altered before the time $t12$.

In order, even in the case of the shortened signal A/1, to emit regular pulse groups, instead of the signals H and K, the signals H/1 and K/1 are produced using the shift register SR2 which is erased with the signal K/1 shortly after the time $t2$. Thus, the binary value 0 is stored in all three cells $q1, q2, q3$. At the time $t3$, the word 000 is thus stored in the shift register SR2. The binary value 1 is constantly conducted via the terminal P1 to the input $a$ of shift register SR2 and is transferred at the time $t4$, so that then the word 100 is stored. At the time $t8$, this binary value moves into the cell $q2$, and at the time $t12$, moves into the cell $q3$. As long as the binary value 0 is emitted from the cell $q3$, the gate GT2 is blocked, and no pulses of the signal E are conducted as sampling signal H/1 to the binary value change discriminator. However, from the time $t12$ onwards, with the binary value 1 of the cell $q3$ the H/1 is released, and then, after the time $t12$, the binary value change discriminator PL emits the signal K/1. With this signal K/1 the content of the shift register SR1 is erased and a second pulse group with D=0, C=0, and A=0 is written into the cells s1, s2 and s3. With the signal K/1, after the time t12, the content of the shift register SR2 is again erased. This causes a 0-signal to be emitted via the cell q3, and no further signal H/1 is conducted to the binary change discriminator PL. Thus, the second pulse group can also be correctly emitted as signal L.

FIG. 3 shows the channel unit KS/2 as a further exemplary embodiment of one of the channel units KS1 to KSn shown in FIG. 1. In addition to the components which have already been explained, the channel unit KS/2 contains a trigger stage KI, a gate GT3 and a binary counter ZL. The pulse group is produced, as in the case of FIG. 2, with the aid of the binary value change discriminator PL and the shift register SR1. In order in the case of the signal A/1, to prevent the premature erasure of the shift register SR1, after the time t2 with the signal K/1 the trigger stage KI is set from its rest state (M=1) to its operative state (M=0) during which with the signal M=0 it blocks the gate GT3 and prevents the emission of further pulses of the signal sampling H/1. The length of time during which the gate FT3 remains blocked is set by the counter ZL. Firstly, with the signal M=0, after the time t2, the counter ZL is started, and the counter is supplied with the pulses of the signal B in the form of counter pulses. It is assumed that with the counter pulses of the signal B which are supplied at the times t4, t8, t12 the count of three is reached. At the time t12, a signal is emitted via the output of the counter ZL to the trigger stage KI, and the latter is reset to its rest state (M=1). In this way, after the time t12, a pulse of the signal H/1 is allowed through to the binary value change discriminator PL. When the signal K/1 is next produced, the second pulse group is again input, as already described.

The principles of the invention are described hereinabove by means of descriptions of preferred embodiments constructed according to those principles. It is to be noted that it is contemplated that the described embodiments might be modified or changed in a variety of ways while remaining within the scope of the invention as defined by the appended claims.

I claim:

1. In a circuit arrangement for the transmission of asynchronously occurring binary data, wherein each change in binary value is assigned a pulse group constituted by a plurality of bits occurring in a time frame defined by a coarse scanning pulse train, and including a pulse discriminator which emits a write-in command upon the occurrence of a change in binary value and upon the arrival of a said scanning pulse, said pulse group being stored in a register upon emission of said write-in command, the improvement comprising:

counter means for counting the pulses in said coarse scanning pulse train upon occurrence of said write-in command and including means for blocking further write-in commands prior to reaching a predetermined count and means for releasing said write-in commands subsequent to reaching said predetermined count.

2. The improved circuit arrangement defined in claim 1 wherein said counter means comprises a shift register having a first input for receiving the binary signal, a second input for receiving said coarse scanning pulse train as shift pulses and a reset input for receiving said write-in commands and having an output connected to a predetermined shift register stage for emitting a signal preparing the counter means for the next write-in command.

3. The improved circuit arrangement defined in claim 2 further comprising:

means for producing a fine scanning signal having a greater pulse repetition frequency than said coarse scanning signal, and AND gate means having an input connected to said predetermined shift register stage output and another input connected to the output of said means for producing and having an output for producing a sampling signal.

4. The improved apparatus defined in claim 1 wherein said counter means comprises a binary counter having an input for receiving said coarse scanning pulse train as counter pulses and including means for emitting a counter signal when a predetermined count is reached, and a trigger stage having inputs coupled to receive said write-in commands and said counter signals, said trigger stage being operable to assume either of two states responsive to signals appearing at its inputs to either emit or suppress a sampling signal, said sampling signal being coupled to said pulse discriminator.

* * * * *